United States Patent [19]
Carone

[11] Patent Number: 5,661,999
[45] Date of Patent: Sep. 2, 1997

[54] MOTORCYCLE SHIFT PEDAL ASSEMBLY

[76] Inventor: Robert P. Carone, 1220 Flora Vista Dr., Santa Barbara, Calif. 90101

[21] Appl. No.: 418,647

[22] Filed: Apr. 10, 1995

[51] Int. Cl.[6] ........................................ G05G 9/02
[52] U.S. Cl. .................. 74/474; 74/473 R; 74/473 P; 74/478; 74/564; 280/291
[58] Field of Search .................. 74/473 R, 473 P, 74/478, 474, 564, 562, 562.5; 180/336; 280/291

[56] References Cited

U.S. PATENT DOCUMENTS

| | | | |
|---|---|---|---|
| 1,675,551 | 7/1928 | Harley et al. | 280/291 |
| 2,600,767 | 6/1952 | Herrell | 74/474 |
| 3,734,224 | 5/1973 | Franklin | 180/336 |
| 4,061,051 | 12/1977 | Grandis | 74/474 |
| 4,802,381 | 2/1989 | Hsin-hsin | 74/564 |
| 5,216,935 | 6/1993 | Shimamura et al. | 74/474 |
| 5,454,580 | 10/1995 | Lin | 74/564 |

*Primary Examiner*—Charles A. Marmor
*Assistant Examiner*—David M. Fenstermacher
*Attorney, Agent, or Firm*—Don B. Finkelstein

[57] ABSTRACT

A motorcycle shift pedal assembly to shift gears in a transmission upward or downward by using downward foot pressure for either upshifting or downshifting wherein there are a pair of shift pedals linked by a lever assembly to move a shift lever and in turn a rod to the transmission to shift gears.

12 Claims, 3 Drawing Sheets

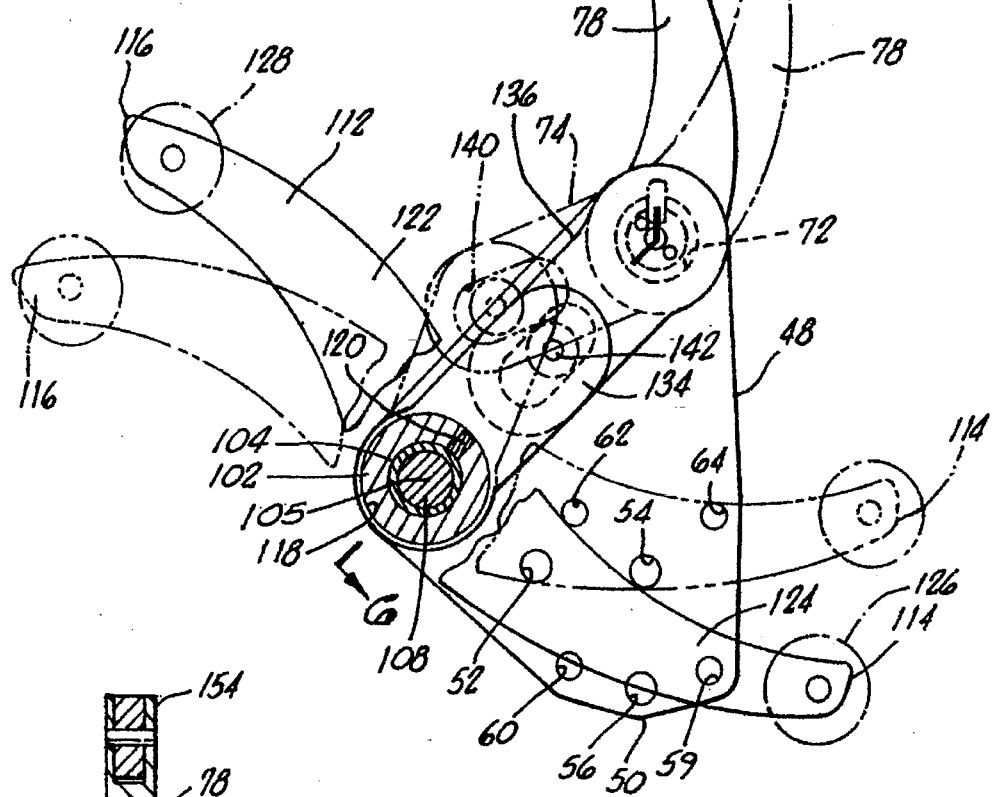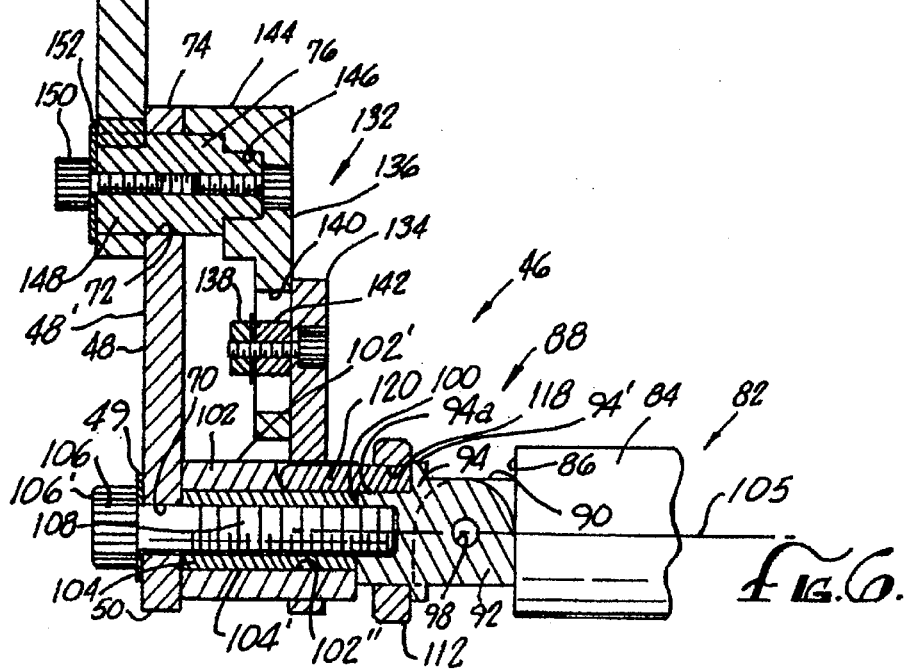

5,661,999

MOTORCYCLE SHIFT PEDAL ASSEMBLY

BACKGROUND OF THE INVENTION

1. Field of the Invention

This invention relates to a motorcycle shift pedal assembly to shift gears of a transmission upward or downward on the engine of a motorcycle.

2. Description of the Prior Art

In motorcycles there is a transmission and a boot pedal mechanism that is mounted on the side of the motorcycle usually on the left side. The foot pedal is connected through cranks to a rod which in term is connected to the transmission to ratchet the gears up for acceleration and down for deceleration. With the prior art mechanism there is an outward projecting foot rest where the sole of the boot or shoe of the left foot rests on it and it abuts the heel during travel and there is a single lever associated with the foot rest which the foot engages for shifting.

If it is desired to accelerate the motorcycle and pass the gears upward from first to possibly fifth gear the boot or shoe is placed under the single lever and with the foot resting on the foot rest the foot is moved upwardly each time the upward shift is desired by placing the shift lever upwardly and move the shift rod accordingly. This is awkward and causes leg muscle tiring and undue ankle pressure.

Also with the prior art shift assembly, when it is desired to downshift for slowing down or coming to a stop, the left foot must be disengaged from the foot rest so that the boot sole now rests on top of the shift pedal. The foot pushes down on the lever and the motorcycle may be shifted downward from the fifth gear, fourth gear, etc. down to neutral. This again requires foot movement from the upward foot engagement to the downward sole engagement. Since neutral lies midway between first and second gear it occasionally happens that neutral is mistakenly engaged instead of second gear, when fatigued. This could cause an accident. It is also awkward to pull up with the top of the foot.

SUMMARY OF THE INVENTION

It is a purpose of the present invention to provide a motorcycle shift pedal assembly where downward foot or heel pressure are used to upshift the transmission for acceleration and also to downshift the transmission for deceleration when a clutch usually on the handlebars is engaged.

Another object of the present invention is to provide a motorcycle shift pedal assembly that includes a footrest projecting outwardly from the motorcycle for the user to rest his foot on and as a part of a shift pedal having a portion that projects upwardly from the foot rest with a foot pedal and a downward portion that also includes a foot pedal.

A still further object of the present invention is to provide a motorcycle shift pedal assembly that includes with the shift pedal, a bell crank assembly and rod lever means secured to a shift rod to engage and disengage a motorcycle transmission to downshift or upshift.

A yet further object of the present invention is to provide a motorcycle shift pedal assembly that may be installed on a motorcycle as original equipment or may be added to a motorcycle at a later date.

A still further object of the present invention is to provide a motorcycle shift pedal assembly that is relatively inexpensive to produce.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following description and by reference to the drawings in which:

FIG. 5 is a detailed view of the shift pedal assembly of the present invention in its upward shifting and downwardly shifting positions for activating a shift rod; and FIG. 6 is cross sectional view of the shift pedal assembly of the present invention takes on line 6—6 of FIG. 5.

DETAILED DESCRIPTION OF THE PREFERRED EMBODIMENT

Figure 1:
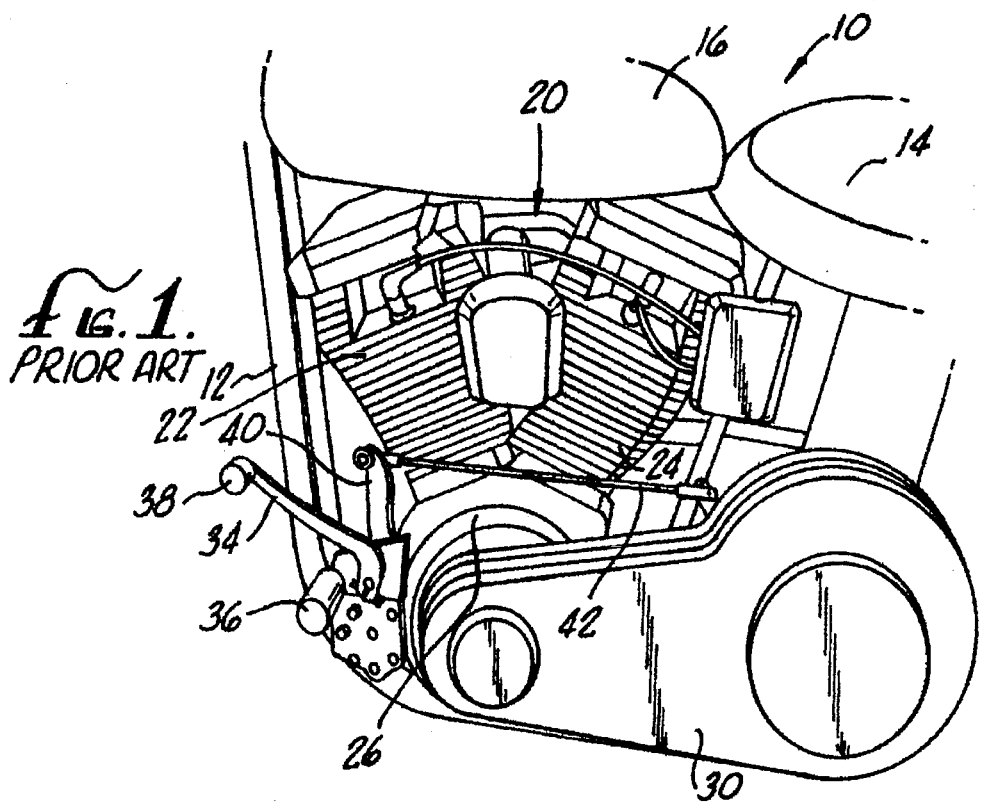
FIG. 1 is a side elevational view of a portion of the left side of a motorcycle with a prior art transmission shift pedal assembly.

Referring now to the drawings, FIG. 1 illustrates a portion of a conventional motorcycle generally designated 10. There is a frame 12, a seat area 14, and a fuel tank 16.

Mounted within the frame 12 is a conventional radial internal combustion engine designated 20 comprising at least cylinders 22 and 24. At the bottom of the cylinder 22 and 24 there is a drive shaft housing 26.

Secured to the drive shaft 26 is a sprocket wheel (not shown) with a sprocket chain (not shown)passing rearwardly to a drive sprocket wheel (not shown) to drive the rear wheel (not shown) of the motorcycle 10. The sprocket wheels and sprocket chain are covered by a sprocket housing 30 to protect the rider and to prevent dirt and debris from clogging the drive assembly.

In addition, there is a conventional transmission and clutch (not shown) associated with the drive assembly to cause movement of the motorcycle 10. The transmission gearing of gears one through five, or what ever number of gears the motorcycle has, are controlled through a transmission gearing clutch on the handle bar engaged so the shifting may be undertaken through downward or upward foot pressure on the conventional single shift lever 34. In the conventional shifter there is also a foot rest 36 projecting outwardly from the motorcycle. This type of acceleration and deceleration is extremely inconvenient in that the rider has to engage his foot under conventional shift bar 38 to move it upwardly and to move the shift lever 40 and in turn the shift rod 42 in a rearward direction and then lift from the foot rest 36 and reposition the foot where it is on top of the shift bar 38 to press downward and move the lever 40 and rod 42 forwardly. The upward movement of the foot or shoe is awkward and may cause soreness to the foot and ankle and also a person's strength is usually less when raising or pivoting a foot upward rather than a direct downward push on the shift bar.

Turning now to FIGS. 2 through 6 there is illustrated my present invention of a new shift pedal assembly generally designated 46 for a motorcycle 10. The main concept which will be discussed in greater detail is that downward foot pressure is used for engaging the transmission for either acceleration or deceleration of motorcycle gears.

Figure 2:
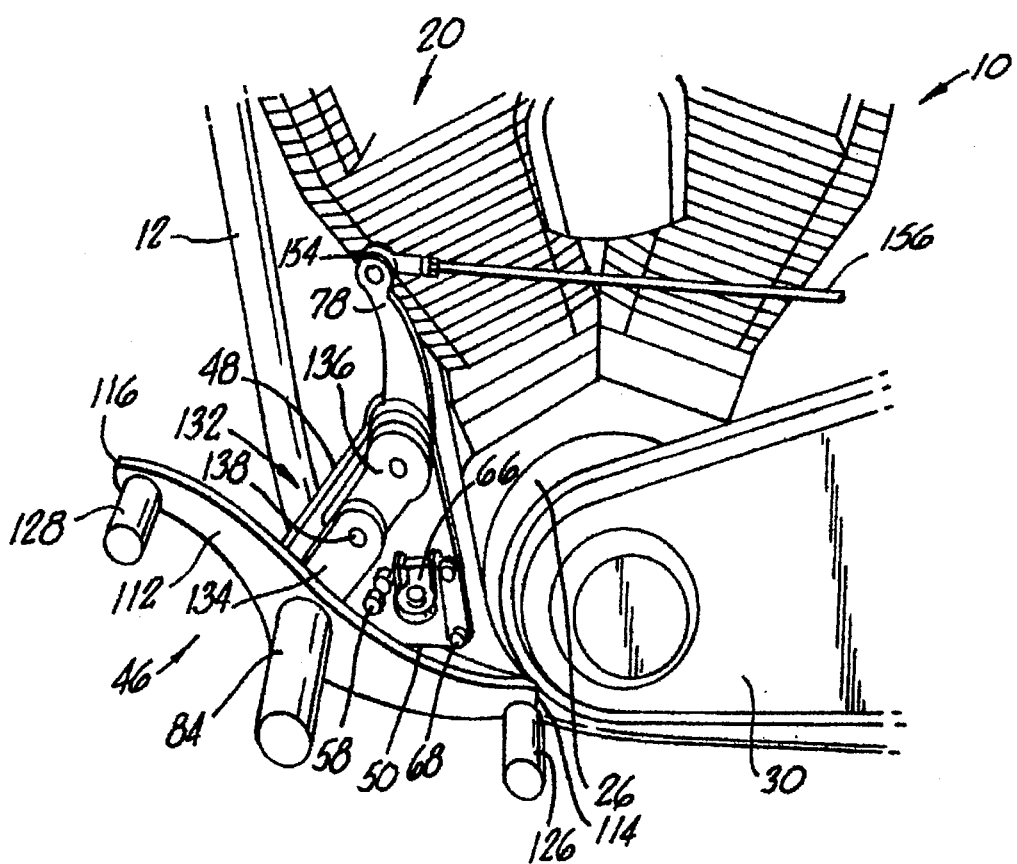
FIG. 2 is a side elevational view of a portion of the left side of a motorcycle illustrating the shift pedal assembly of the present invention in a neutral position.
Figure 3:
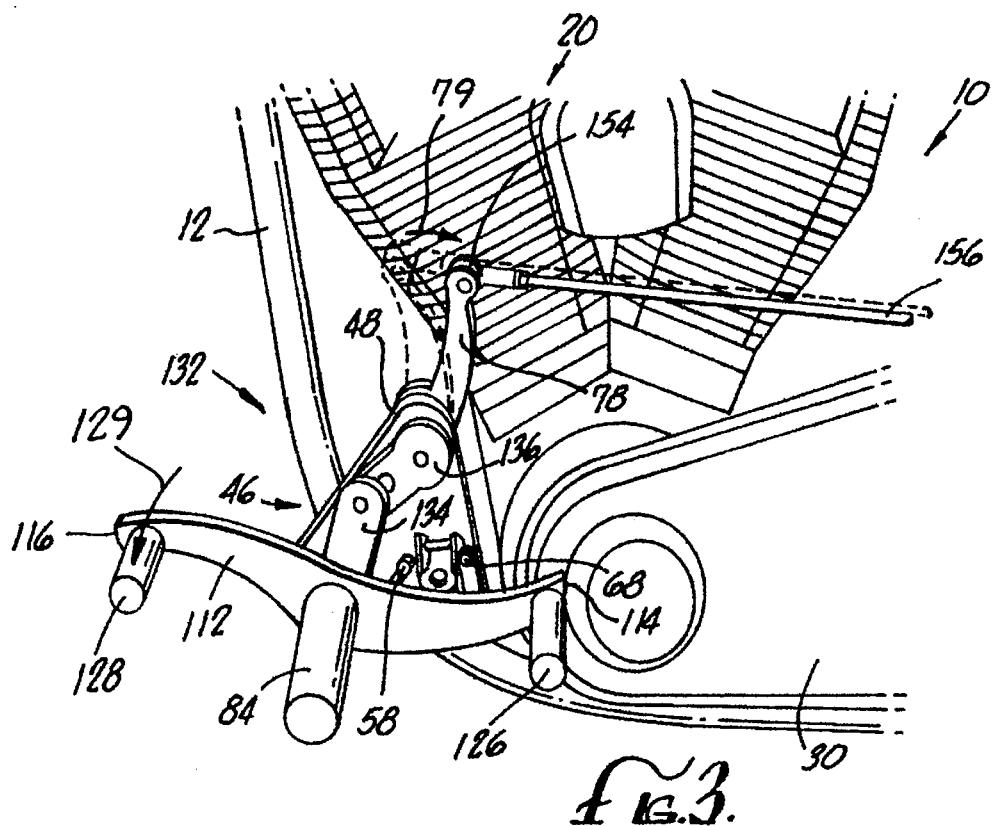
FIG. 3 is a view similar to FIG. 2 but with the shift pedal of the present invention in a forward downward position.
Figure 4:
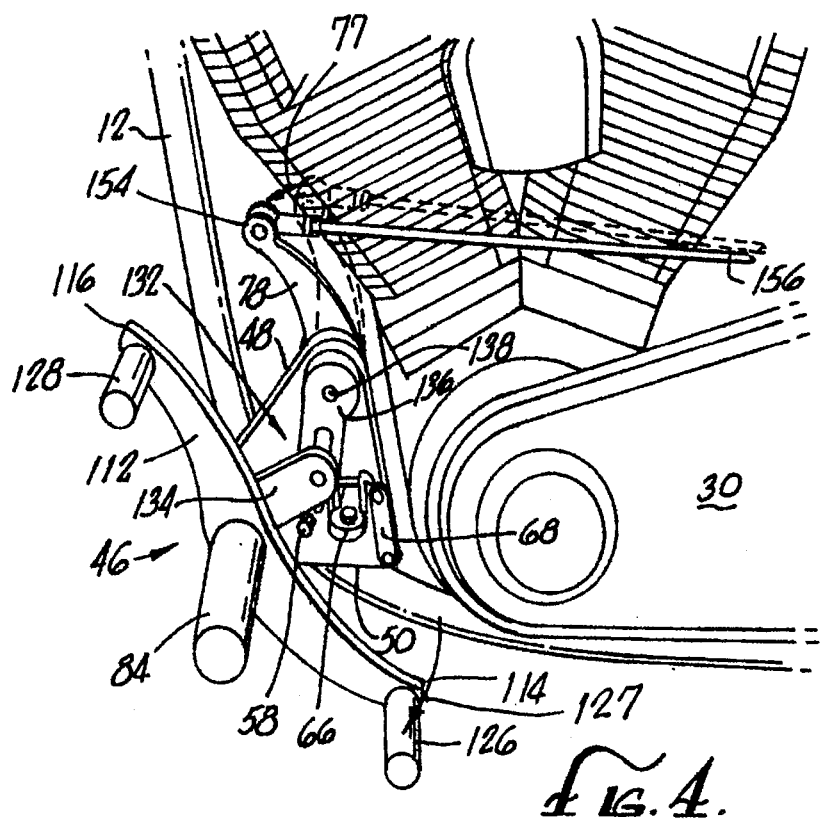
FIG. 4 is a view similar to FIG. 2 but with the shift pedal of the present invention in a rearward downward position.

FIG. 2 illustrates the shift assembly 46 in a neutral position. FIG. 3 illustrates the inventive assembly 46 in a rearwardly moving position to up shift a motorcycle 10 through the gears from a lower gear to a higher gear for acceleration. FIG. 4 illustrates the inventive assembly 46 in a forward downward position to down shift a motorcycle 10 from a higher gear to a lower gear for deceleration or to a neutral gear.

Again the motorcycle 10 includes a frame 12 (part of which is illustrated in the drawings) and an internal combustion engine 20. At the bottom of the engine 20 is the drive shaft housing 26 and a sprocket housing 30 covering sprocket wheels and a sprocket chain (not seen).

Mounted to the motorcycle frame 12 is a shift assembly mounting plate 48. The plate 48 adjacent its lower end in the lower half thereof (see FIG. 5) has a series of openings. Openings 52, 54 and 56 are for attaching the plate 48 to the motorcycle frame 12 by bolts 58, one of which is seen passing into opening 52 in FIGS. 2, 3 and 4. The remaining four openings 59, 60, 62 and 64 (see FIG. 5) are bored through the plate 48 and at least some are threaded. These four bores 59 through 64 are to receive a conventional kick stand a portion of which is illustrated at 66. Bolts 68 are used to affix the kick stand 66 to the plate 48.

The plate 48 is also provided with a foot rest bore 70 (see FIG. 6) and a bore 72 at the upper end 74 of plate 48 to receive a rod shift lever bearing 76 to which is attached a rod shift lever 78.

Mounted to the shift assembly mounting plate 48 adjacent the bottom 50 thereof is a foot rest generally designated 82. It preferably includes an annular piece of bar stock as a rest portion 84 that projects outward from the motorcycle 12 upon which to rest the instep of the foot. At the end 86 (see FIG. 6) there is a hinge means designated 88. It includes a pair of spaced apart hinge plates 90. There is a single extending hinge plate 92 that extends outward from a foot rest annular extension 94 that is seated between the pair of spaced apart hinge plates 90. A hinge pin (not shown) passes through hinge pin opening 98. Such a construction of a hinged foot rest 84 is not unusual on motorcycles so that in the event of a turn and the motorcycle angles too sharply the foot rest may give by hinging so that it will not cause an accident by gouging into the road. The foot rest 84 instead of being annular could be shaped in the configuration of a bicycle pedal so there is a broader surface for resting the instep of the shoe or boot without departing from the spirit of the invention. The foot rest annular extension 94 extends toward the motorcycle 12 from the single extending hinge plate 92 and abutting the end 100 of foot rest annular extension 94 is an outer annular collar 102 which acts as a pivot shaft for a shift pedal arm means 112. Mounted within the collar 102 is an annular elongated bushing 104.

In order to rotatably secure the foot rest assembly 82 a bolt 106 with its head portion on the inside of plate 48 has an elongated threaded portion 108 that passes through bore 70 and the annular elongated bushing busing 104 into the foot rest annular extension 94. In this way the foot rest 84 may be rotated so that it will not cause the rest 84 to bend while riding the motorcycle with foot pressure thereon.

As another element of the shift pedal assembly 46 there is provided shift pedal arm designated 112. The arm is elongated and in side view preferably forms a lazy S with a bottom end 114 and a top end 116. There is a center bore 118 and the arm 112 is swedged onto the outer collar 102 by means of swedge pin 120 (see FIGS. 5 and 6) so that as the pedal arm 112 rotates so will the outer collar 102.

The lazy S is formed with the outward curvature of an upper section 122 of arm 112 from the bore 118 outward to the end 116. This coupled with the inward curvature of a lower section 124 of arm 112 from the center bore 118 to bottom end 114 forms the lazy S shape in side elevational profile.

Adjacent the respective ends of 114 and 116 are rear shift pedal 126 and forward shift pedal 128 that are preferably formed of annular bar stock and project outwardly from the shift pedal arm 112. They may be affixed to the arm 112 in any conventional manner. In addition, the shift pedals 126 and 128 could be shaped as modified bicycle foot pedals, that is pedals with a broader surface for shoe or foot engagement without departing from the spirit of the invention.

The preferred angle from the shift pedal 126 through the center of the arm 112 where bolt 106 extends and through the shift pedals 128 is approximately a 140° angle. This has been found to result in the best comfort for the foot of a rider.

In addition, in side elevational profile the shift pedal arm may be a lazy V shape with the bottom of the V representing the pivot point of the respective ends 114 and 116.

FIGS. 5 and 6 best illustrate the mounting arrangement for the foot rest 82 and the shift pedal arm 112. As shown thereon, the outer annular collar 102 has an outer cylindrical surface 102' and an inner cylindrical surface 102" and a pivot axis 105 about which the outer annular collar pivotally rotates. The inner cylindrical surface 102" rotates on the outer bearing surface 104' of the annular elongated bushing 104 which is concentrically mounted with the outer annular collar 102. The head 106' of bolt 106 bears against the inner surface 48' of shift assembly mounting plate 48 through washer 49. The threaded portion 108 of the bolt 106 threadingly engages the inner end 94a of foot rest annular extension 94 and tightening of the bolt 106 moves the inner end 94a of foot rest annular extension into contact with the shift pedal arm 112 as indicated at 94'. Similarly, when the bolt 106 is loosened, the foot rest 82 is free to rotate about the pivot axis 105 to a rotational orientation as may be selected by the user. For the bolt 106 tightened, the foot rest 82 does not rotate with the shift pedal arm 112 but remains stationary with respect thereto as to such pivotal movement. For the condition of the bolt 106 tightened, the interface at 94' between the foot rest 82 and the shift pedal arm 112 is a bearing surface during rotation of the shift pedal arm 112. The swedge pin 120 connection between the shift pedal arm 112 and the outer annular collar 102 causes the outer annular collar 102 to rotate about pivot axis 105 during the rotation of the shift pedal arm 112. Thus, the outer annular collar 102 acts as an annular pivot shaft for rotation of the shift pedal arm means 112 as shown by the relative positions thereof in FIGS. 2, 3 and 4 and as indicated by the solid line showing and the phantom line showing of shift pedal arm 112 in FIG. 5.

Spaced inwardly from the shift pedal assembly 46 toward the motorcycle frame 12 is a pivotal lever means or bell crank assembly means designated 132. There is a first lever arm 134 that is fixedly secured to the outer collar 102 and a second lever arm 136 that is connected to the first arm 134 and to rod shift lever 78.

There is provided a pivot pin 138 that passes through the arm 134 into and through the second arm 136. The arm 136 included an elongated cam slot 140 within which rides a cam follower 142 associated with pin 138.

The second arm 136 adjacent its top end 144 includes a pivot bore 146 into which the annular rod shift lever bearing 76 is mounted. The annular rod shift lever bearing 76 extending inwardly from the second lever arm 136 through bore 72 and terminates inwardly of the plate 48 providing an extension 148. Mounted on the extension 148 is the rod shift lever 78. The lever 78 and second lever arm 136 are held together in pivotal relationship by a threaded bolt 150 through a washer 152 bearing against the lever 78, through the bearing 76 and the lever 136.

Secured to the upper end 154 of rod shift lever 78 is a conventional shift rod 156 that extends rearwardly to a conventional motorcycle transmission (not seen) to be engaged to shift the motorcycle gears upward or downward.

In operation, the foot through a boot or shoe of the rider rests on the foot rest 84 usually on the instep with the foot rest 84 butting against the heel of the boot or shoe.

The front of the boot or shoe usually lightly rests on the forward shift pedal 128 in a neutral position (see FIG. 2). Therefore, when the engine 20 is turned on and it is desire to move from the neutral position in FIG. 2 for forward movement the forward shift pedal 128 is moved. To engage the gear (FIG. 3) the foot pivots on the rest 84 pushing down on the pedal 128 in the direction of the arrow 129. This in turn will rotate the first lever 134 forwardly and upwardly. The pivot pin 142 and cam follower 142 will move downwardly in cam slot 140 which in turn rotates the second lever arm 136. This in turn will rotate the rod shift lever 78 rearwardly, see arrow 79 in FIG. 3 and cause the rod 156 to move rearwardly to engage the first gear. The procedure is repeated through the hand clutch and the gears to reach the driving gear required for the acceleration desired.

When it is desired to slow and stop the motorcycle it is necessary to down shift the gears to neutral. In order to accomplish this the foot is moved rearwardly on the foot rest 84 so that the heel rests on rear pedal 126. The heel then pushes down on the pedal 126 in the direction of arrow 127 and the resulting effort is illustrated in FIG. 4. Here the first lever arm 134 for bell crank assembly 132 moves rearwardly and downward. The second lever arm 136 is pivoted rearwardly by means of pivot pin 138 and cam follower 142. This in turn rotates the rod shift lever 78 to rotate forwardly in the direction of arrow 77 pulling on rod 156 so that the gears move downwardly from one gear to the next. The heel is lifted and the process of clutching and depressing the pedal 126 is repeated until the gearing has shifted down to another lower gear or in the case of a full stop to neutral.

With the present invention the shifting with downward foot pressure for up shifting or down shifting eliminates what is known as "impact" shifting by upward pressure for the foot and accidental shifting into neutral is prevented. Conversely, due to the leverage developed between the length of the rod shift lever 78 and the bell crank assembly 132, a lighter force is employed to complete a shift. This also creates a greater pivotal travel of the shift pedal arm 112 compared to conventional shift levers as seen in FIG. 1. These two factors combine to allow finding of neutral (which lies between first and second gears) much easier than in prior art devices.

As can be seen the present invention reverses the conventional shift pattern of the transmission. With the present invention the foot upshifts with the same action one would use to downshift on conventional shifters. Thus always using downward pressure for either shifting creates a much more natural effect.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarify of reading and not for emphasis.

I claim:

1. A motorcycle shift pedal assembly which is connected to a transmission of a motorcycle to shift the gears upward from a lower gear to a higher gear for acceleration and downward from a higher gear to a lower gear for deceleration where the motorcycle includes a frame, clutch means on said motorcycle that engages said transmission to allow shifting into various gears as desired, wherein said shift pedal assembly comprises:

a shift assembly mounting plate secured to said frame;

a shift pedal arm means having a pair of opposed ends and including a pivot shaft intermediate said opposed ends, said pivot shaft pivotally mounted on said shift assembly mounting plate and connected to said shift pedal arm means for pivotal rotation therewith about a pivot axis, said shift pedal arm means including a foot rest centrally mounted thereon for selective movement about said pivot axis relative to said shift pedal arm means, said foot rest projecting outward from said shift pedal arm means, and a front shift pedal mounted adjacent one of said pair of opposed ends of said shift pedal arm means and a rear shift pedal mounted adjacent said other of said opposed ends of said shift pedal arm means so that downward foot pressure on either of said shift pedals will simultaneously pivot said shift pedal arm means, and said front shift pedal and said rear shift pedal and said pivot shaft;

pivotal lever means including a portion fixedly secured to said pivot shaft of said shift pedal arm means for simultaneous pivotal movement with movement of said shift pedal arm means;

a rod shift lever pivotally associated with said pivotal lever means adapted for backward and forward pivotal movement by downward foot pressure on either of said front shift pedal or said rear shift pedal of said shift pedal arm means; and a shift rod extending from said rod shift lever to said transmission that upon downward foot pressure on a first of said front shift pedal and said rear shift pedal pivots said shift pedal arm means in a first direction and up shifts the gears from a lower gear to a higher gear and downward foot pressure upon the second of said front shift pedal and said rear shift pedal pivots said shift pedal arm means in a second direction opposite said first direction and down shifts the gears from a higher gear to a lower gear.

2. A motorcycle shift pedal assembly as defined in claim 1 wherein:

said foot rest is hingedly mounted to said shift assembly mounting plate whereby said foot rest may be moved generally vertical from its in use horizontal position.

3. A motorcycle shift pedal assembly as defined in claim 1 wherein:

said shift pedal arm forms a lazy V in side elevation.

4. A motorcycle shift pedal assembly as defined in claim 1 wherein:

said shift pedal arm forms a lazy S in side elevation.

5. A motorcycle shift pedal assembly as defined in claim 1 wherein the angle between each of said ends passing through said pivot point is approximately 140°.

6. A motorcycle shift pedal assembly as defined in claim 1 wherein:

said pivotal lever means is a bell crank assembly,.

7. A motorcycle shift pedal assembly as defined in claim 6 wherein said bell crank assembly includes:

a first lever arm fixedly secured to said shift pedal arm means;

a second lever arm pivotally secured to said first lever arm and including additional pivot means passing through said shift assembly mounting plate to said pivotal rod shift lever wherein rearward pivotal rotation of said shift pedal arm will translate to forward pivotal rotation of said rod shift lever and forward downward pivotal rotation of said shift pedal arm will translate to rearward pivotal rotation of said rod shift lever and in turn forward or rearward movement of said shift rod respectively.

8. A motorcycle shift pedal assembly as defined in claim 7 wherein:

said second lever arm includes an elongated cam slot wherein a cam follower passes from said first lever arm through said elongated cam slot to allow sliding movement of said cam follower during the pivoting of said shift pedal arm.

9. The arrangement defined in claim 1 wherein:

said first of said front shift pedal and said rear shift pedal is said front shift pedal, and said second of said front shift pedal and said rear shift pedal is the rear shift pedal.

10. The segment defined in claim 9 wherein:

said pivot shaft is an outer annular collar and has an outer cylindrical surfaces and an in inner cylindrical surface, and further comprising:

an elongated annular busing having an outer being surface for bearing engagement with said inner cylindrical surface of said outer annular collar for the condition of rotation of said outer annular collar about said pivot axis, and an inner cylindrical surface defining a cylindrical cavity having a pivot axis, and said pivot shaft and said elongated annular bushing concentrically mounted with respect to said pivot axis;

a bolt extending through said cylindrical cavity of said elongated annular bushing, and said bolt having a head potion on the inside of said shift assembly mounting plate, and a threaded portion in said cylindrical cavity and said threaded portion engaging said foot rest and said foot rest restrained from pivotal motion about said pivot axis for the condition of said bolt tightened and free to rotate about said pivot axis for the condition of said bolt loosened.

11. A motorcycle shift pedal assembly which is connected to a transmission of a motorcycle to shift the gears upward for acceleration and downward for deceleration where the motorcycle includes a frame, clutch means on said motorcycle that engages said transmission to allow gear shifting into various gears as desired, wherein said shift pedal assembly comprises:

a shift assembly mounting plate secured to said frame;

an elongated shift pedal arm having a pair of opposed ends having a pivot point and pivotally mounted on said shift assembly mounting plate, said pedal arm including an outwardly projecting foot rest at said pivot point and a shift pedal mounted on each of said ends thereof;

a bell crank assembly including a first lever arm fixedly secured to said shift pedal arm means, a second lever arm pivotally secured to said first lever arm and including an additional pivot means passing through said shift assembly mounting plate:

a rod shift lever connected to a transmission shift rod and pivotally connected to said second lever arm adapted for backward and forward pivotal movement by downward foot pressure on either of said shift pedal arms, whereby rearward downward pivotal rotation of said shift pedal arm will translate to forward pivotal rotation of said rod shift lever and forward downward pivotal rotation of said shift pedal arm will translate to rearward pivotal rotation of said rod shift lever and in turn forward or rearward movement of said shift rod respectively.

12. A motorcycle shift pedal assembly as a defined in claim 11 wherein:

said second lever arm includes an elongated cam slot wherein a cam follower passes from said first lever arm through said elongated cam slot to allow sliding movement of said pivot pin during the pivoting of said shift pedal arm.

* * * * *